United States Patent
Axelrod et al.

(10) Patent No.: US 9,265,281 B2
(45) Date of Patent: Feb. 23, 2016

(54) PET CHEW FORMING APPARATUS FOR DRUG DISPENSING, METHODS OF FORMING PET CHEW PRODUCTS AND PET CHEW PRODUCTS THEREOF

(75) Inventors: Glen S. Axelrod, Colts Neck, NJ (US); Nancy S. Rivadeneira, Union, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 795 days.

(21) Appl. No.: 13/472,287

(22) Filed: May 15, 2012

(65) Prior Publication Data

US 2013/0309293 A1    Nov. 21, 2013

(51) Int. Cl.
*A22C 7/00* (2006.01)
*A23P 1/12* (2006.01)
(Continued)

(52) U.S. Cl.
CPC . *A23P 1/125* (2013.01); *A22C 7/00* (2013.01); *A23K 1/003* (2013.01); *A23K 1/1643* (2013.01); *A23K 1/1646* (2013.01); *A23K 1/1853* (2013.01); *A23N 17/005* (2013.01)

(58) Field of Classification Search
CPC ....... A01K 5/0114; A01K 39/01; A22C 7/00; A22C 7/046; A22C 7/0084; B28B 3/24; B28B 3/26; B29C 37/0003; B29C 37/0007; B29C 37/001; B29C 37/0014; B29C 37/0017; B29C 37/0021; A21C 3/00; A21C 3/04; A21C 7/00–7/0092; A23P 1/125; A23N 17/005; A23K 1/003; A23K 1/1643; A23K 1/1646; A23K 1/1853
USPC ....................... 424/442, 410, 439; 425/129.1, 425/259–260, 440, 443, 556; 426/279–280; 119/57.2, 61.2
See application file for complete search history.

(56) References Cited

U.S. PATENT DOCUMENTS 1,741,023 A * 12/1929 Kajiwara ........................ 425/572
2,021,794 A * 11/1935 Leone ............................ 425/574
(Continued)

FOREIGN PATENT DOCUMENTS

DE    198 53 729    3/2000
EP    1 095 901    5/2001
(Continued)

OTHER PUBLICATIONS

International Search Report and Written Opinion from corresponding PCT Appln. No. PCT/US13/41080 dated Aug. 12, 2013.

*Primary Examiner* — Kevin P Shaver
*Assistant Examiner* — Andrew StClair
(74) *Attorney, Agent, or Firm* — Grossman, Tucker, Perreault & Pfleger, PLLC

(57) ABSTRACT

A pet chew forming apparatus for dispensing a medicament comprising a plunger having an elongated piston operable with a piston cylinder of a housing. The piston is extendable from and retractable into the piston cylinder by sliding movement, and includes a receptacle having an opening. The plunger is positionable in a first loading position relative to the housing to expose the opening to the receptacle such that a medicament is insertable into the receptacle through the opening, and positionable in a second loading position relative to the housing to expose the opening to the receptacle such that an edible composition is insertable into the receptacle through the opening. The plunger is also positionable in an ejection position relative to the housing to eject a pet chew comprising the edible composition and medicament from the receptacle.

18 Claims, 8 Drawing Sheets

(51) Int. Cl.
- *A23N 17/00* (2006.01)
- *A23K 1/00* (2006.01)
- *A23K 1/16* (2006.01)
- *A23K 1/18* (2006.01)

(56) References Cited

U.S. PATENT DOCUMENTS

| | | | | |
|---|---|---|---|---|
| 2,099,638 | A * | 11/1937 | Wiley | A22C 7/0076 425/195 |
| 2,413,046 | A * | 12/1946 | Holly | 425/556 |
| 2,958,093 | A * | 11/1960 | Jenkins | 425/574 |
| 3,070,003 | A * | 12/1962 | Stacy | 100/51 |
| 3,491,401 | A * | 1/1970 | Holly | 425/556 |
| 3,765,056 | A * | 10/1973 | Holly | 425/556 |
| 4,257,145 | A * | 3/1981 | Bovino | 425/556 |
| 4,372,008 | A * | 2/1983 | Sandberg | 425/562 |
| 4,857,333 | A | 8/1989 | Harold | |
| 5,310,332 | A * | 5/1994 | Ito et al. | 425/169 |
| 5,670,186 | A * | 9/1997 | Nishimura et al. | 425/151 |
| 5,674,515 | A | 10/1997 | Wesenhagen | |
| 5,792,470 | A | 8/1998 | Baumgardner, Sr. | |
| 5,853,757 | A | 12/1998 | Durand et al. | |
| 5,895,662 | A * | 4/1999 | Meyer | 424/439 |
| 5,902,621 | A * | 5/1999 | Beckett et al. | 426/279 |
| 6,143,316 | A | 11/2000 | Hayden et al. | |
| 6,576,246 | B1 | 6/2003 | Denesuk et al. | |
| 6,749,783 | B2 * | 6/2004 | Everett | 264/109 |
| 6,905,703 | B2 * | 6/2005 | Rothamel et al. | 424/439 |
| 7,455,515 | B2 * | 11/2008 | Pruden et al. | 425/562 |
| 7,648,666 | B2 * | 1/2010 | Everett | 264/319 |
| 8,109,757 | B1 | 2/2012 | Fusi, III | |
| 2002/0105107 | A1 * | 8/2002 | Everett | 264/69 |
| 2002/0140119 | A1 * | 10/2002 | Hofmann | 264/40.1 |
| 2002/0140132 | A1 * | 10/2002 | Seta et al. | 264/328.11 |
| 2003/0038406 | A1 * | 2/2003 | Zimmet | 264/328.1 |
| 2004/0088072 | A1 * | 5/2004 | Yamazaki | 700/200 |
| 2004/0096541 | A1 * | 5/2004 | Deng et al. | 425/575 |
| 2005/0048182 | A1 * | 3/2005 | King et al. | 426/549 |
| 2005/0079264 | A1 | 4/2005 | Leech et al. | |
| 2007/0261641 | A1 | 11/2007 | Manley-Hood | |
| 2008/0114295 | A1 | 5/2008 | Glynn | |
| 2009/0151649 | A1 * | 6/2009 | Vardy | A23N 17/005 119/710 |
| 2009/0302059 | A1 | 12/2009 | Romanyszyn et al. | |
| 2011/0054411 | A1 * | 3/2011 | Dowds et al. | 604/198 |
| 2011/0091522 | A1 | 4/2011 | Murwitz | |
| 2011/0127294 | A1 | 6/2011 | Pearcy et al. | |
| 2011/0297090 | A1 | 12/2011 | Chamberlain et al. | |
| 2012/0006272 | A1 | 1/2012 | Colvin et al. | |

FOREIGN PATENT DOCUMENTS

| | | |
|---|---|---|
| GB | 191422392 | 6/1915 |
| WO | 03/030863 | 4/2003 |
| WO | 2008/063627 | 5/2008 |
| WO | 2011/137025 | 11/2011 |

* cited by examiner

PET CHEW FORMING APPARATUS FOR DRUG DISPENSING, METHODS OF FORMING PET CHEW PRODUCTS AND PET CHEW PRODUCTS THEREOF

FIELD

The present disclosure relates to pet chew products, methods of forming pet chew products, apparatus to form pet chew products and methods of entertaining pets with pet chew products. The pet chew products formed are particularly suitable for dispensing of drugs and other medicaments to an animal.

BACKGROUND

One problem encountered by many pet owners relates to the administering of drugs, dietary supplements and other medicaments to their pet. For various reasons, pets are often reluctant to orally ingest such medicaments and often become stressed, along with their owners, in the process.

Traditionally, pet owners have attempted to hide medicaments in food, which may ordinarily be particularly desirable to the pet. For example, owners may wrap the medicament in a piece of sliced cheese or meat. However, often times the pet is able to dislodge the medicament from such sliced food, and thereafter ingest the food without ingesting the medicament.

Alternatively, as taught by U.S. Pat. No. 4,857,333, a bone shaped treat may contain a pocket therein, which may be opened and into which a pill may be inserted. The pocket may then be closed by deformation of the bone shaped treat. However, because there is no actual adhesion formed between the pill and the bone shaped treat, during ingestion of the treat the pet may be able to crack or otherwise sever the pocket and remove the pill there from without ingesting the pill.

Furthermore, due to the differences in sizes between various pills, often a single size pocket is not suitable for many different sized pills.

In an attempt to overcome the aforementioned difficulties, U.S. Publication No. 2005/0079264 describes an edible dough wrap for use in an oral delivery method for administering a medicament to an animal. According to the disclosure, the dough has extensibility characteristics that allow it to form a homogeneous mass with the medicament. As a result of the improved extensibility, the disclosure sets forth that is very difficult for an animal to separate out the medicament from the dough, thus allowing easy administration of medicaments such as pills and tablets to an animal. The '264 Publication goes on to set forth that the dough may be sold as a block from which the customer may break off a portion, and the pill is wrapped in the dough to form a film between the pill and the dough which is difficult to break down. However, the '264 patent does not disclose how the dough wrap may be handled by the customer without the dough wrap similarly being very difficult to remove from the pet owner's hands after handling, or utensils when broken off from the block.

SUMMARY

In one aspect, the present disclosure relates to a pet chew forming apparatus for dispensing a medicament comprising a plunger having an elongated piston operable with a piston cylinder of a housing. The piston is extendable from and retractable into the piston cylinder by sliding movement, and includes a receptacle having an opening. The plunger is positionable in a first loading position relative to the housing to expose the opening to the receptacle such that a medicament is insertable into the receptacle through the opening, and positionable in a second loading position relative to the housing (i.e. different from the first loading position) to expose the opening to the receptacle such that an edible composition is insertable into the receptacle through the opening. The plunger is also positionable in an ejection position relative to the housing to eject a pet chew comprising the edible composition and medicament from the receptacle.

In certain embodiments, the receptacle may include a plurality of raised elements on a bottom wall thereof which support the medicament away from a bottom of the receptacle.

In certain embodiments, the housing may includes a connection port operable to connect with a container of the edible composition. The connection port may comprise a mechanical (threaded) connector. The threaded connector may include internal threads to connect with external threads located on the container of the edible composition. The container of the edible composition may comprise a flexible container.

In certain embodiments, the receptacle may include a window which aligns with a window in the housing when the plunger is positioned in the second loading position such that, when edible composition is inserted into the receptacle, the edible composition is visible through the aligned windows as the edible composition fills the receptacle.

In certain embodiments, at least one of the plunger and the housing may include a scale to determine a fill level of the receptacle.

In certain embodiments, the plunger may include an unloading means to unload the pet chew from the receptacle. The unloading means may comprise a movable bottom wall of the receptacle.

In certain embodiments, the receptacle may include a liner. An aperture may be located beneath the liner such that the liner may be depressed to eject the pet chew from the receptacle. The liner may be reusable to form a plurality of pet chews. Alternatively, the liner may be edible and become part of the pet chew. The liner may be made of paper, and include a pouch to receive the edible composition. In certain embodiments, the plunger positionable in a second loading position relative to the housing is further positionable such that the edible composition insertable into the receptacle through the opening is also insertable into the pouch.

In certain embodiments, a method of forming a pet chew is provided comprising providing a pet chew forming apparatus as set forth above; positioning the plunger in the first loading position and inserting the medicament into the receptacle; positioning the plunger in the second loading position and inserting the edible composition into the receptacle such that the edible composition at least partially encapsulates the medicament; and positioning the plunger in the ejection position and ejecting the pet chew from the receptacle, the pet chew comprising the edible composition and the medicament.

BRIEF DESCRIPTION OF THE DRAWINGS

The detailed description below may be better understood with reference to the accompanying figures which are provided for illustrative purposes and are not to be considered as limiting any aspect of the disclosure.

FIG. 1 illustrates an isometric view of a first non-limiting embodiment of a pet chew forming apparatus according to the present disclosure;

DETAILED DESCRIPTION

Figure 1A:
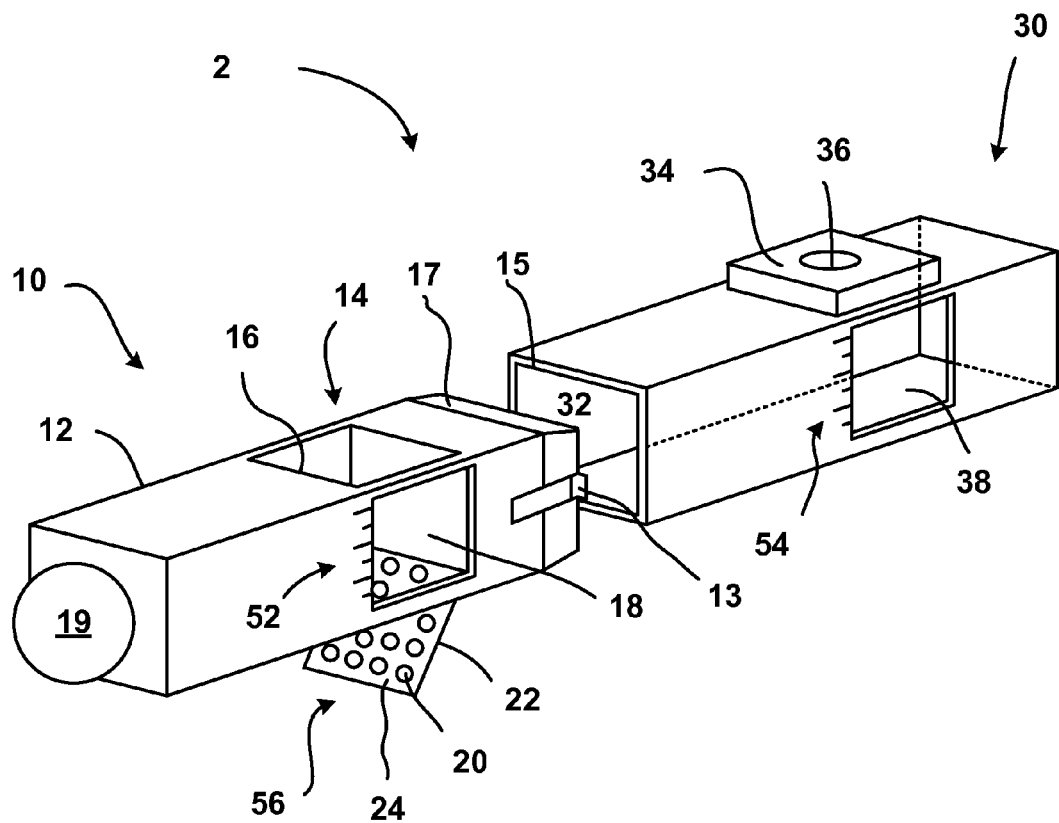
FIG. 1A illustrates a close-up top view of the piston and piston cylinder of the embodiment of FIG. 1.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

The present disclosure relates to pet chew products, methods of forming pet chew products, apparatus to form pet chew products and methods of entertaining pets with pet chew products.

An example of a non-limiting embodiment of a pet chew forming apparatus to form a pet chew product contemplated herein is illustrated in FIGS. 1-7. As shown, pet chew forming apparatus 2 comprises a plunger 10 having an elongated piston 12 operable within a housing 30 having a piston cylinder 32. Plunger 10 and housing 30 may be made of any suitable materials including plastic, metal, ceramic, glass or any combination thereof.

The piston 12 of plunger 10 is extendable from and retractable into the piston cylinder 32 of the housing 30 by sliding movement. In that regard, one or more sliding surfaces of the piston 12 and/or piston cylinder 32 may comprise a material having a low coefficient of friction, such as polytetrafluoroethylene (PTFE).

Figure 1A:
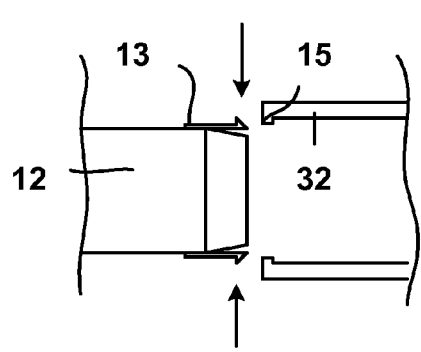

Plunger 10 and housing 30 may be connectable and disconnectable from each other by deformable mechanical connection means 13 which, as shown in FIG. 1 and FIG. 1A, comprise flexible snap tabs which may be configured to engage an edge or lip 15 of housing 30 at the entrance to piston cylinder 32, and disengage the housing 30 by being deflected inward. To better facilitate assembly, a leading distal portion 17 of piston 12 of plunger 10 may by tapered. Furthermore, plunger 10 may include a handle 19 to manipulate the piston 12 relative to the housing 30.

Piston 12 may be particularly keyed to housing 30 such that piston 12 may only be inserted into piston cylinder 32 in one certain orientation to inhibit improper installation. As shown, piston 12 and piston cylinder 32 housing 30 are rectangular, with piston 12 and cylinder 32 having a rectangular cross-sectional shape. In other embodiments, piston 12 and cylinder 32 may have a cylindrical, square, triangular or other cross-sectional shape.

Figure 2A:
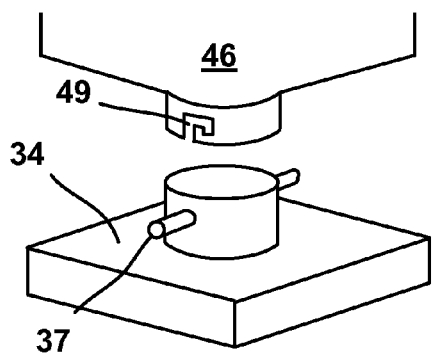
FIG. 2A illustrates a close-up view of a connection port according to another embodiment of the invention.
Figure 2:
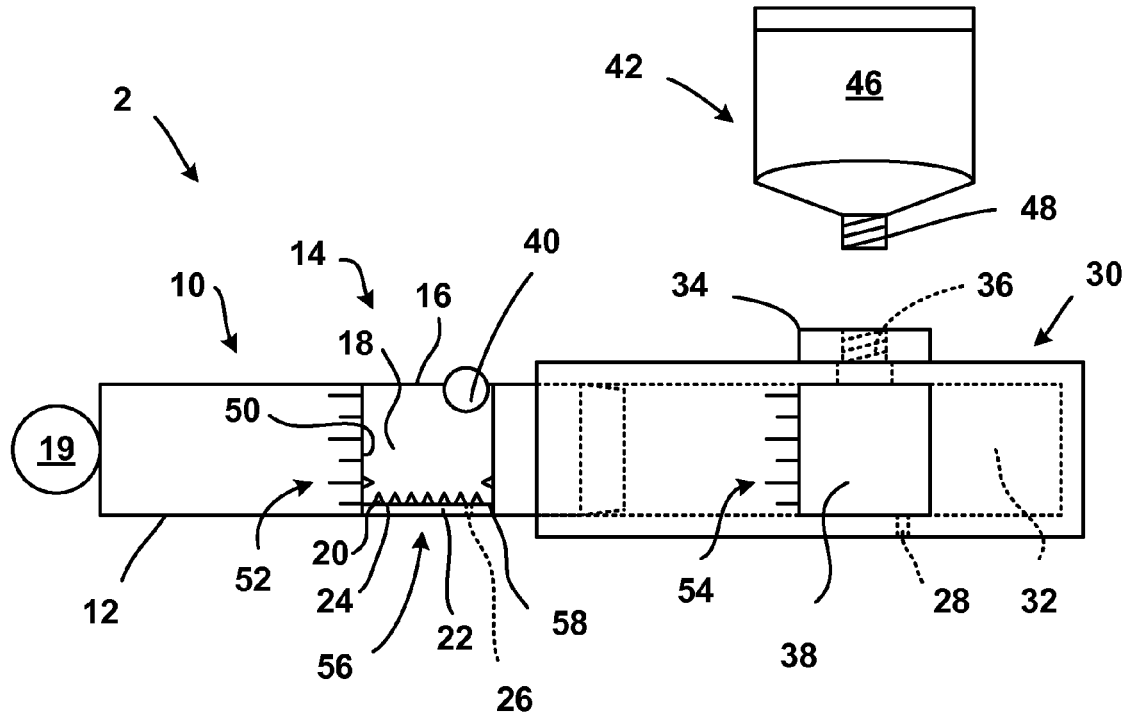
FIG. 2 illustrates a side view of the pet chew forming apparatus of FIG. 1 with the plunger in a fully extended position before forming a pet treat.
Figure 5:
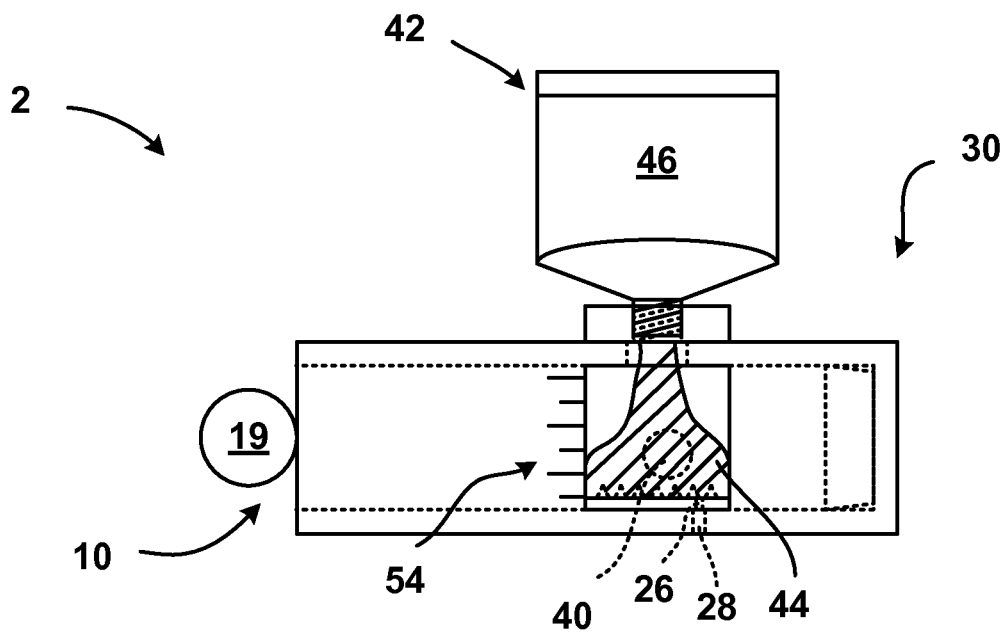
FIG. 5 illustrates a side view of the pet chew forming apparatus of FIG. 1 with the plunger in a fully retracted position during forming a pet treat.

In addition to piston cylinder 32, housing 30 includes a connection port 34 on a longitudinal side of the piston cylinder 32, which is operable to connect the housing 30 with a supply source 42 to dispense an edible composition 44 (see FIG. 5). As shown, the edible composition 44 may be particularly contained in a flexible container 46, such as a tube. Edible composition 44 may particularly be an edible composition in the form of a paste, which may flow at room temperature (68-72° F.), to form a pet chew. As best shown in FIG. 2, connection port 34 comprises a threaded connector with includes internal threads 36 to connect with external threads 48 of flexible container 46. In other embodiments, as shown in FIG. 2A, connection port 34 may comprise a male (pin) connector 39 which mechanically engages with a female (L or U-shaped slotted) connector 49 of the flexible container 46, such as a bayonet (rotate-and-lock) connection. In other embodiments, the connectors 39 and 49 may be reversed.

As shown throughout FIGS. 1-7, piston 12 includes a receptacle 14 with an access opening 16 formed in a longitudinal side of piston 12. As shown, at least one side wall of receptacle 16 may include a window 18 formed from a transparent material to visually see the contents of receptacle 14. As set forth below, in order to better visually determine a proper filling level of receptacle 14 with edible composition 44, window 18 may align with a window 38 in the housing 30 during use of pet chew forming apparatus 2.

Referring now to FIG. 2, supply source 42 of edible composition 44 is shown connected to housing 30. Plunger 10 is shown fully extended and positioned in a first loading position relative to the housing 30 to expose the opening 16 to the receptacle 14 such that a medicament 40 may be inserted into the receptacle 14 through opening 16. The receptacle 14 may include a plurality of raised elements 20 (shown as being cone shaped), to operate as stand-offs on a bottom wall 22, and support the medicament 40 away from the bottom surface 24 of bottom wall 22. Raise elements 22 may comprise flexible (deformable) plastic elements (e.g. a thermoplastic elastomer or thermoset rubber). Raised elements may also be located on one or more side walls 50 of the receptacle 14.

As used herein a "medicament" may be understood as a substance used in the medical diagnosis, cure, treatment or prevention of disease, such as a pharmaceutical drug or nutritional supplement. Medicament 40 may particularly be in solid form for oral ingestion, such as a pill, tablet or capsule and may include a plurality of such pills, tables or capsules for coating with an edible composition attractive to an animal.

Figure 3:
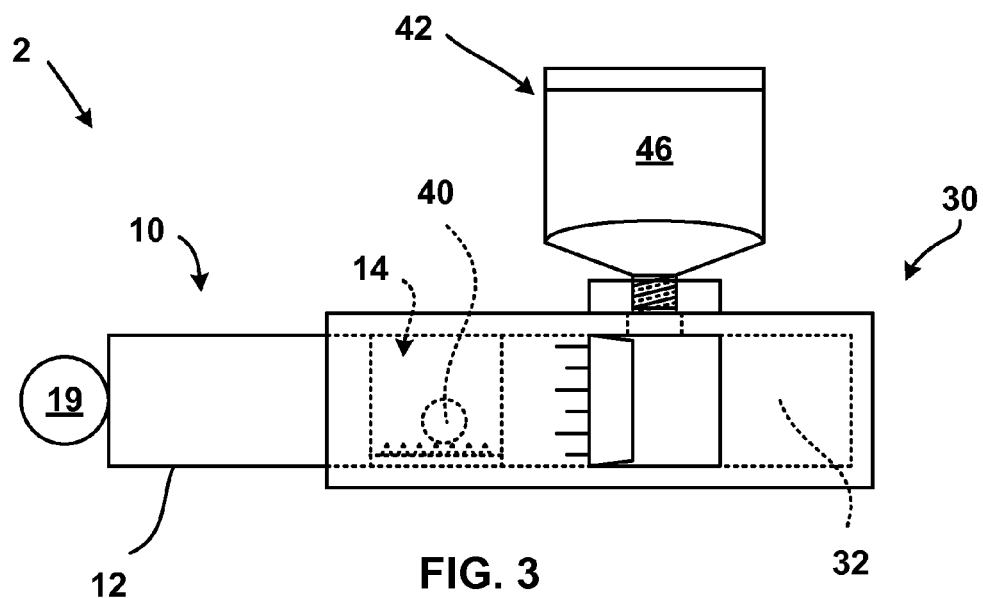
FIG. 3 illustrates a side view of the pet chew forming apparatus of FIG. 1 with the plunger in an intermediate position between being fully extended and fully retracted.

Referring to FIG. 3 plunger 10 is shown in an intermediate position between fully extended position and fully retracted position. In FIG. 3, plunger 10 is retracted (depressed) into housing 30 at least as far for housing 30 to function as a cover to close access to opening 16 and receptacle 14.

Figure 4:
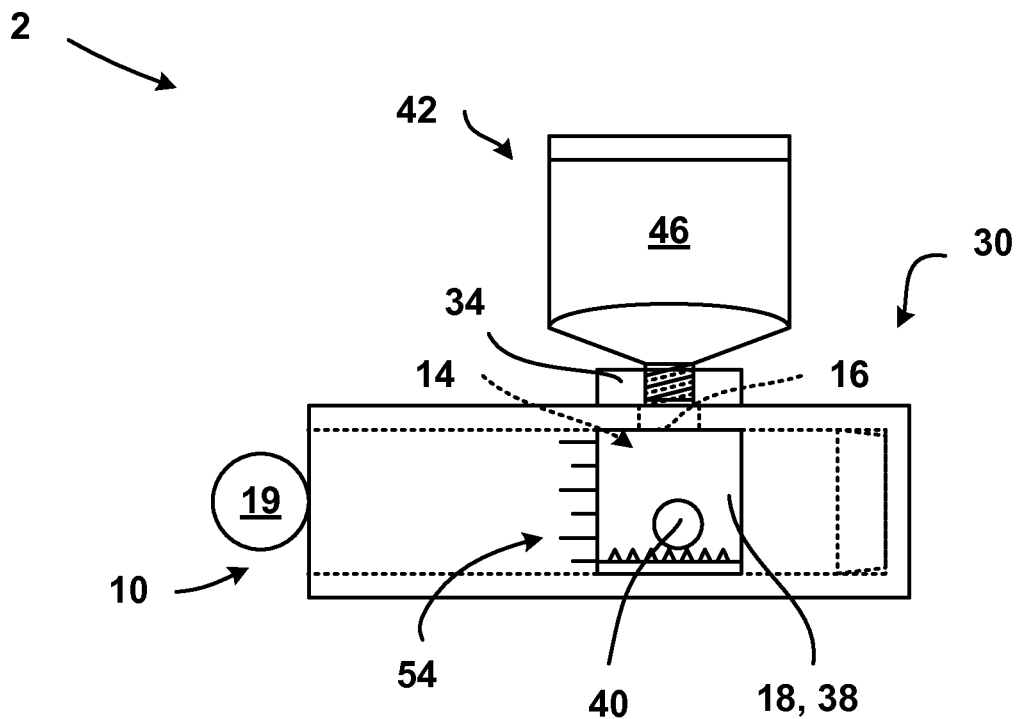
FIG. 4 illustrates a side view of the pet chew forming apparatus of FIG. 1 with the plunger in a fully retracted position prior to forming a pet treat.

Referring to FIG. 4, plunger 10 is shown fully retracted and positioned in a second loading position relative to the housing 30 to expose the opening 16 to the receptacle 14 such that the edible composition 44 from supply source 42 may be inserted into the receptacle 14 through the opening 16. Edible composition 44 may be introduced to the receptacle 14 by a user of apparatus 2 particularly by squeezing or otherwise compressing flexible container 46 once attached to housing 30.

As shown in FIG. 5, when introduced into receptacle 14, edible composition 44 may mold and flow around and at least partially encapsulate, and may more particularly fully encapsulate, medicament 40. Increased encapsulation may be accomplished, for example, by use of raised elements 20 which may allow the edible composition 44 to flow beneath the medicament 40 as the receptacle 14 is being filled with edible composition 44. Furthermore, edible composition 44 may form an adhesive bond with medicament 40 whereby the medicament 40 becomes difficult to separate from the edible composition 44. As receptacle 14 is being filled with edible composition 44, air may be allowed to exit from receptacle 14 through a vent aperture 28 located in the bottom of housing 30, which may align with a vent aperture 26 located in the bottom wall 22 of piston 12. A vent may also be located in the portion of the housing 30 adjacent opening 16 to receptacle 14.

In order to better visually determine a proper filling level of receptacle 14 with edible composition 44, the receptacle may include a window 18 which aligns with a window 38 in the housing 30 when the plunger 10 is positioned in the second loading position, such that when the edible composition 44 is inserted into the receptacle 14, the edible composition 44 is visible through the aligned windows 18 and 38 as the edible composition fills the receptacle 14. While windows 18 and 38 are shown as being of equal size and complete alignment to optimize viewing, it should be understood that the windows 18 and 38 only need by partially aligned for viewing into receptacle 16. Thus, for example, window 18 may be much narrower than window 38, or vise-versa, in certain other embodiments.

Window 18 may be particularly provided by a section of transparent glass or plastic, such as polycarbonate or acrylic. With regards to the housing 30, window 38 may also be provided by a section of transparent glass or plastic, or merely provided by an aperture formed in the side wall of the housing 38. In the foregoing manner, filling of receptacle 14 may be visually observed by a user of apparatus 2, who may terminate filling of receptacle 14 once medicament 40 is sufficiently encapsulated in edible composition 44, or receptacle 14 is full, or at any point there between.

In addition, at least one of the plunger 12 and the housing 30 may include a scale 52 and/or 54 respectively including one or more (linear) graduations to help the user of apparatus 2 determine a proper fill level for receptacle 14.

Once receptacle 14 is adequately filled with edible composition 44, plunger 12 may be maintained at the second loading position for a predetermined time until the resulting pet chew 60 is ready to be ejected from the receptacle 14, depending on the nature of the edible composition 44. In certain embodiments, edible composition 44 may undergo hardening and solidifying after being dispensed from flexible container 46 and into receptacle 14. For example, edible composition 44 may have a viscosity which increases after being dispensed from flexible container due to evaporation of a plasticizer or other flow aid (e.g. e.g. hardens and/or solidifies due to evaporation of water). In another embodiment, edible composition 44 may have a viscosity which increases after being dispensed from flexible container due to a temperature change (e.g. hardens and/or solidifies particularly from undergoing a temperature change from above to below a melting temperature of the composition). In yet another embodiment, edible composition 44 may have a viscosity which increases after being dispensed from flexible container due to chemical reaction (e.g. hardens and/or solidifies due to cross-linking). With regards to the foregoing mechanisms, it should be understood that the first alternative may offer certain advantages in not relying upon a temperature change or a chemical reaction to induce solidification.

Figure 6:
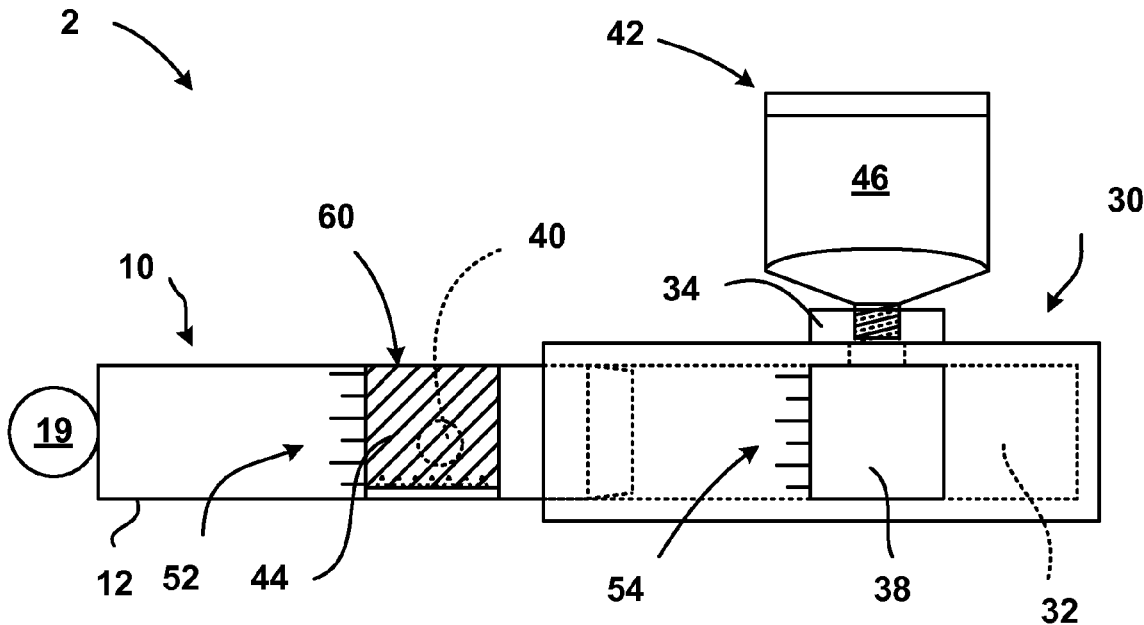
FIG. 6 illustrates a side view of the pet chew forming apparatus of FIG. 1 with the plunger in a fully extended position after forming a pet treat.
Figure 7:
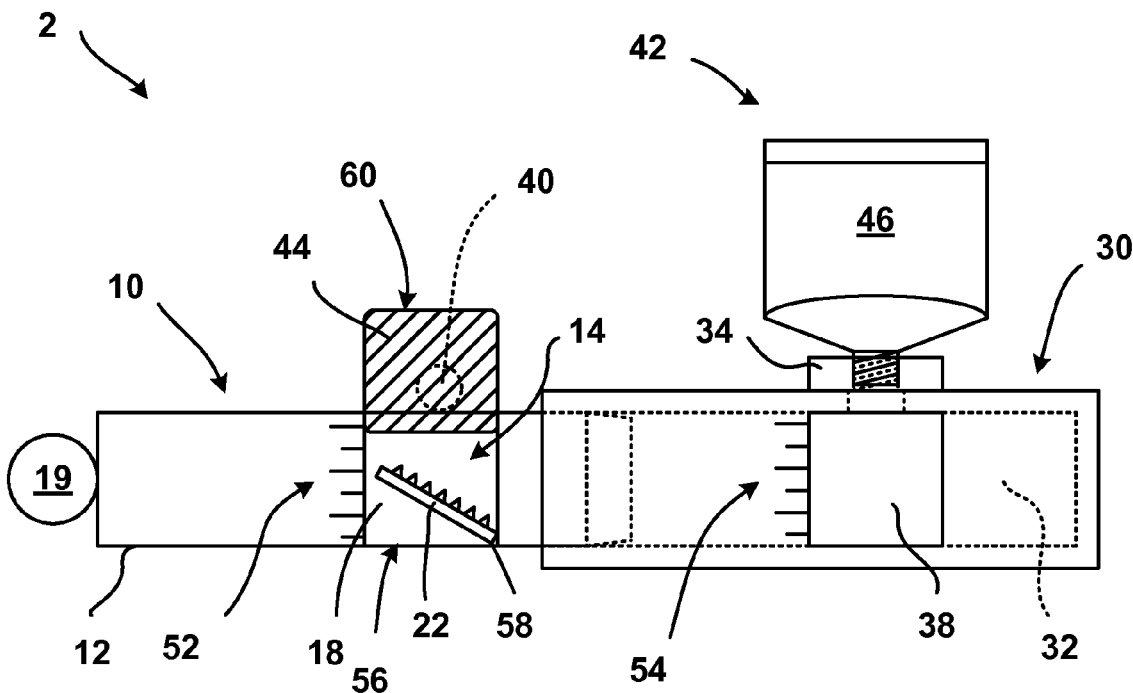
FIG. 7 illustrates a side view of the pet chew forming apparatus of FIG. 1 with the plunger in a fully extended position after ejecting a pet treat.

Thereafter, referring to FIGS. 6-7, the plunger 12 is positionable in an ejection position relative to the housing 30 to eject a pet chew 60 comprising the edible composition 44 and the medicament 40 from the receptacle 14.

As shown in FIG. 7, the plunger 12 includes an unloading means 56 to unload the pet chew 60 from the receptacle 14. As shown, unloading means 56 may comprise a movable bottom wall 22 of receptacle 14, which may more particularly operate as a hinged door which moves into the receptacle 14. When unloading means 56 is actuated, such as by rotating bottom wall 22 of receptacle 14 at hinge 58, the pet chew 60 may be ejected through the opening 16 of receptacle 14.

Figure 8:
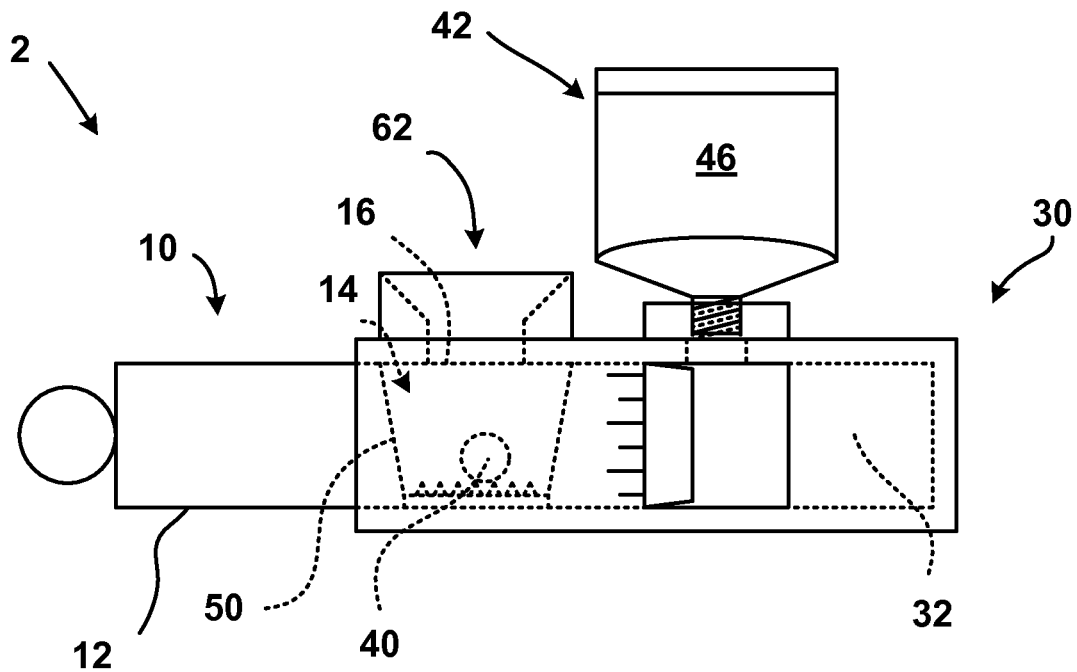
FIG. 8 illustrates a side view of another non-limiting embodiment of a pet chew forming apparatus according to the present disclosure.

Referring now to FIG. 8, in another embodiment of the present disclosure, housing 30 of pet chew forming apparatus 2 may include a medicament loading port 62 in the form of a funnel through which to insert and load receptacle 14 with medicament 40 while plunger 12 is in an intermediate position between its fully extended position and fully retracted position. Also as shown, one or more sidewalls 50 of the receptacle 14 may be tapered extending continuously inwards towards the bottom of receptacle 14 to make ejection of pet chew 60 easier.

Figure 9:
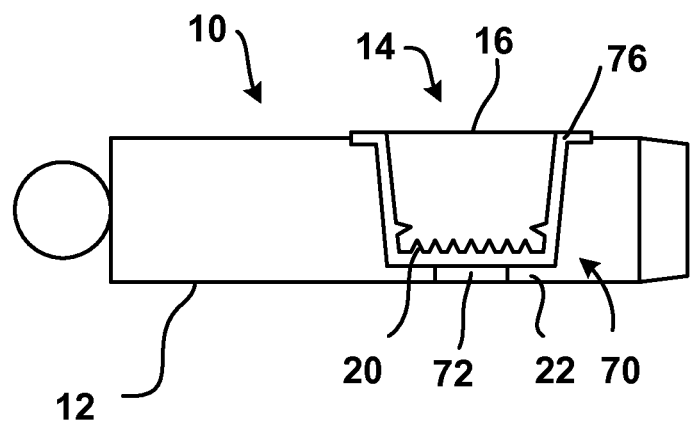
FIG. 9 illustrates a cross-sectional side view of a plunger of another non-limiting embodiment of a pet chew forming apparatus according to the present disclosure.

Referring now to FIG. 9, in another embodiment of the present disclosure, receptacle 14 may include a receptacle liner 70, such as made of plastic (e.g. a thermoplastic elastomer or thermoset rubber), which may overlie a fixed bottom wall 22 of receptacle 14. In this embodiment, bottom wall 22 is no longer movable as with the first embodiment, and may include an aperture 72. Also, in this embodiment, raised elements 20 may be part of liner 70. As shown, receptacle liner 70 has a U-shape and may be secured to the remainder of piston 12 by tabs 76 adhesively or mechanically joined to piston 12.

Figure 10:
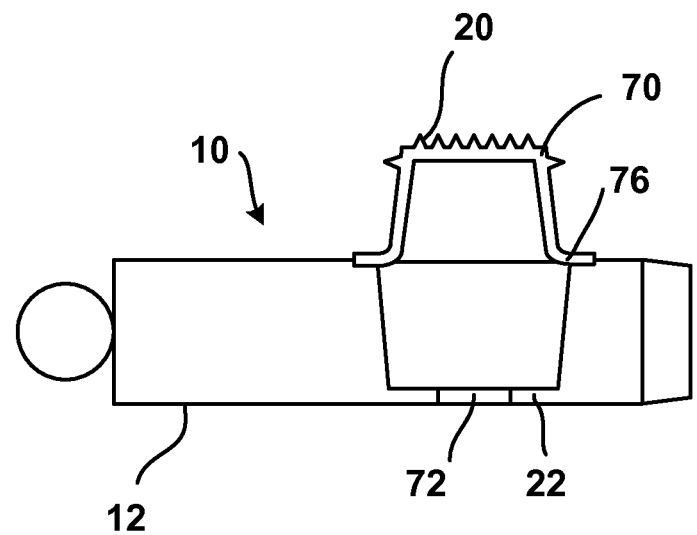
FIG. 10 illustrates another cross-sectional side view of the plunger of FIG. 9 according to the present disclosure.

In operation, as shown in FIG. 10, after forming pet chew 60, pet chew 60 may be ejected from receptacle 14 by depressing on and deforming receptacle liner 70, through aperture 72, towards opening 16 of receptacle. In this embodiment, receptacle liner 70 may be particularly comprised of a material which does not stick to pet chew 60, which may include polytetrafluoroethylene (PTFE), such that receptacle liner 70 is readily separable from pet chew 12. As such, in such embodiment, receptacle liner 70 is reusable in the forming of a plurality of pet chews 60.

Figure 11:
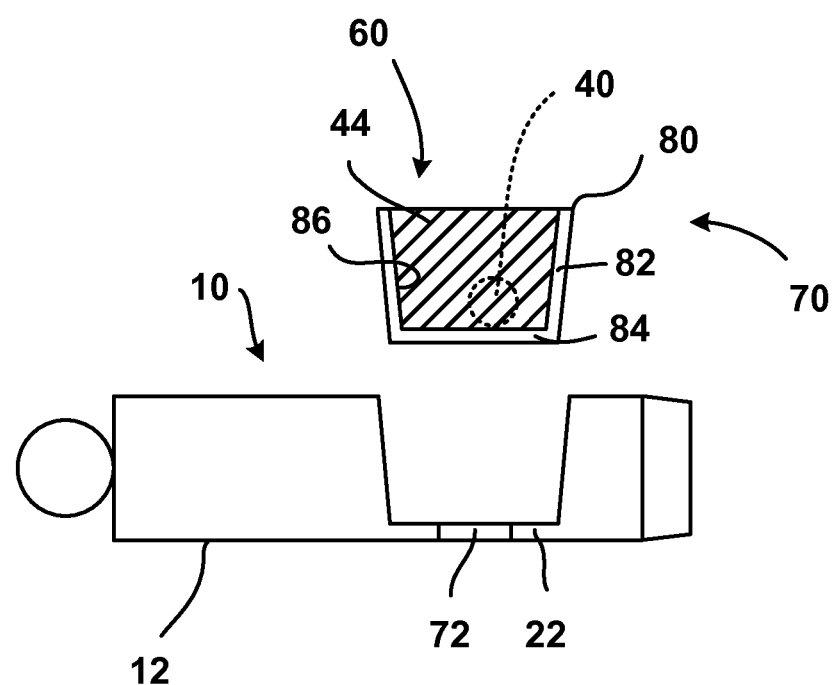
FIG. 11 illustrates a cross-sectional side view of a plunger of another non-limiting embodiment of a pet chew forming apparatus according to the present disclosure.

Referring now to FIG. 11, in another embodiment of the present disclosure, receptacle liner 70 may also be in the form of an edible cup shaped pouch 80 having side walls 82 and a bottom wall 84 which define a pouch cavity 86 within receptacle 14. As the pouch 80 is edible, raised elements 30 are not required in the present embodiment. In this embodiment, receptacle liner 70 may adhesively join with edible composition 44 become part of pet chew 60.

After ejecting the previously formed pet chew 60, a new liner 70 is first inserted in receptacle 14 prior to inserting medicament 40. Thereafter medicament 40 is inserted in the receptacle 14, the plunger 10 is then moved from the extended position to the retracted position, and the edible composition 44 is inserted into the receptacle 14 through the opening 16 and into the pouch cavity 86.

Figure 12:
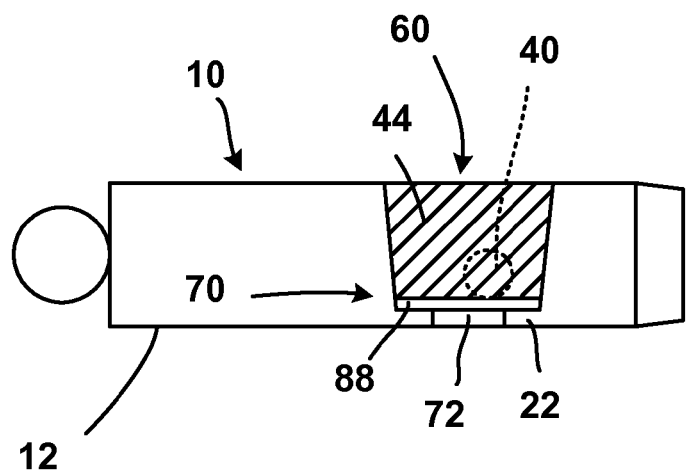
FIG. 12 illustrates a cross-sectional side view of a plunger of another non-limiting embodiment of a pet chew forming apparatus according to the present disclosure.

Referring now to FIG. 12, in another embodiment of the present disclosure, liner 70 may only comprise an edible planar base plate 88 for pet chew 60 (e.g. edible rice paper), which may again replace the need for raised elements 20. In this regard, liner may have a thickness in a range of 0.1 mm to 2.5 mm, and more particularly a thickness in a range of 0.25 mm to 1.5 mm. Similar to the prior embodiment, receptacle liner 70 may adhesively join with edible composition 44 become part of pet chew 60. As such, for the present embodiment, a new liner 70 is required for every pet chew 60, and such is inserted into the receptacle 14 through opening 16 when the plunger 10 is in the first loading position relative to the housing 30 to expose the opening 16 to the receptacle 14. After ejecting the previously formed pet chew 60, a new liner 70 is first inserted in receptacle 14 prior to inserting medicament 40. Thereafter medicament 40 is inserted in the receptacle 14, the plunder 10 is moved to the retracted position, and the edible composition 44 is inserted into the receptacle 14 through the opening 16.

Figure 13:
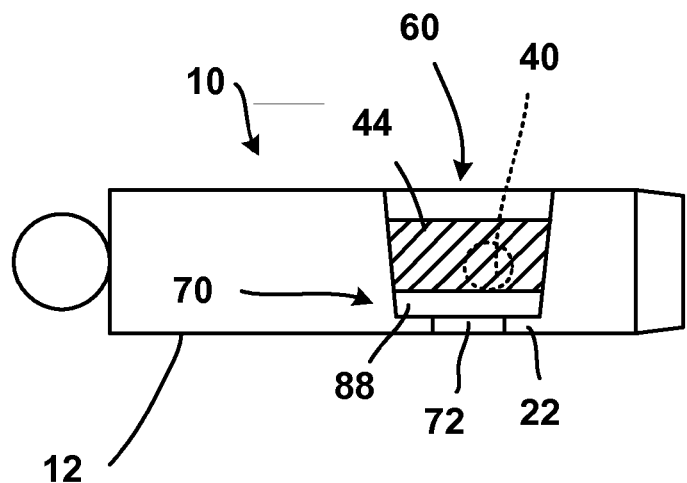
FIG. 13 illustrates a cross-sectional side view of a plunger of another non-limiting embodiment of a pet chew forming apparatus according to the present disclosure.
Figure 14:
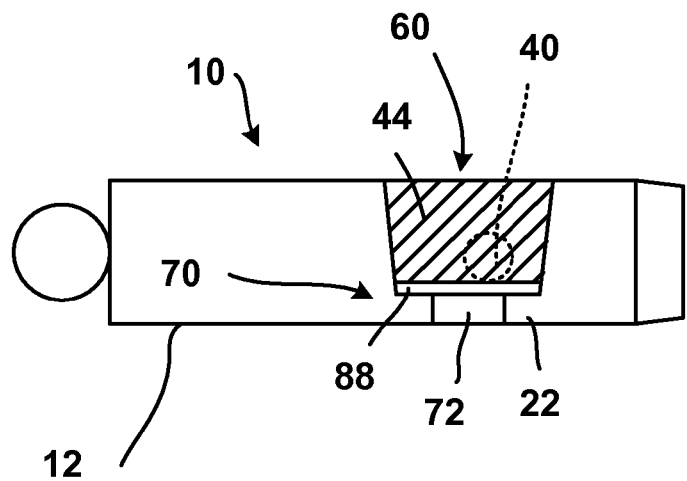
FIG. 14 illustrates a cross-sectional side view of a plunger of another non-limiting embodiment of a pet chew forming apparatus according to the present disclosure.

Referring now to FIG. 13, receptacle liners 70 of a different thickness may be employed to change the thickness or weight ratio of the edible composition 44 to the edible liner 70. Furthermore, in referring to FIG. 14, pistons 12 with different sized receptacles 14 may be employed to change the maximum size of the pew chew 60.

Figure 15:
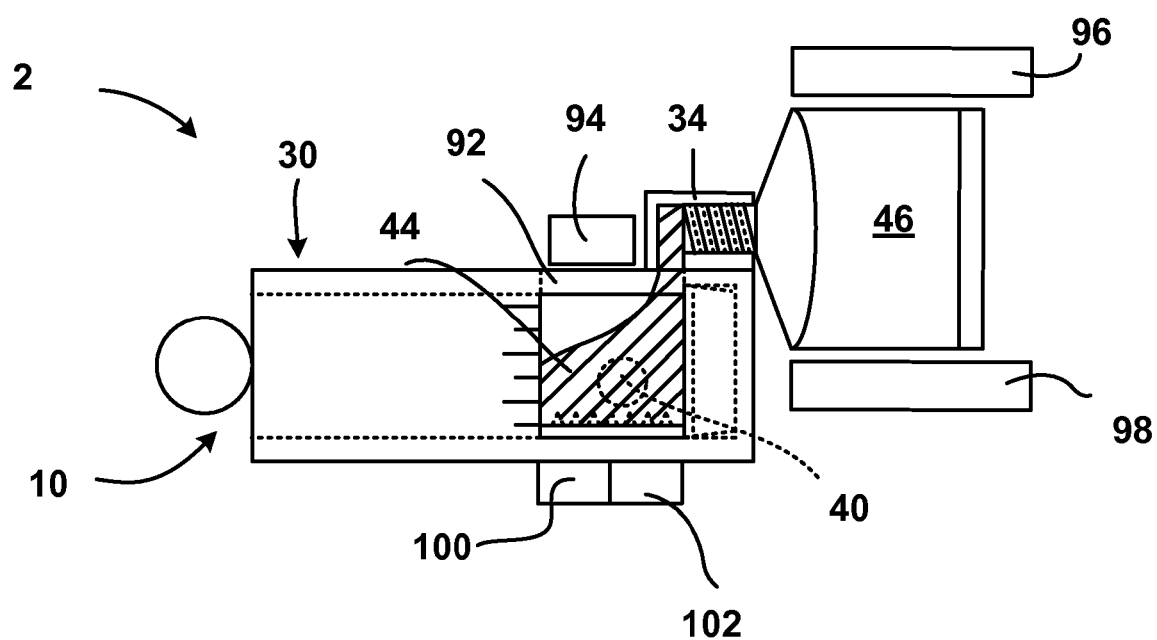
FIG. 15 illustrates a side view of another non-limiting embodiment of a pet chew forming apparatus according to the present disclosure.

Referring now to FIG. 15, depending on the flow characteristics of the edible composition 44, the supply source 46, and the edible composition 44 therein, may be heated to a predetermined temperature above room temperature by heater 96, or cooled to a predetermined temperature below room temperature by cooler 98, prior to the edible composition 44 being dispensed therefrom to expedite solidification thereof. Similarly, after being introduced into receptacle 16, edible composition 44 may be heated to a predetermined temperature above room temperature by heater 100, or cooled to a predetermined temperature below room temperature by cooler 102 to expedite solidification thereof. Furthermore, a fan 94 may be used to circulate air onto edible composition 44 as it is being introduced to receptacle 14, or thereafter, to solidify the chew for ejection more quickly. In this regards, solidification may be understood as the process of becoming harder or solid by cooling, drying, crystallization or chemical reaction.

As set forth above, edible composition 44 may undergo hardening and solidifying after being dispensed from flexible container 46 and into receptacle 14. In one embodiment, edible composition 44 may have a viscosity which increases after being dispensed from flexible container due to evaporation of a plasticizer, solvent or other flow aid (e.g. hardens and/or solidifies due to evaporation of water). For example, in one embodiment, edible composition 44 may be an edible sugar containing composition which may dry to a smooth, hard, matte finish upon evaporation of the water therein, such as ordinarily associated with royal icing.

The sugar composition may be a mixture of confectioners' sugar (powdered or icing), meringue powder (dried egg whites, sugar, salt, vanillin and gum), extract (vanilla, lemon or almond) and water. For example, source 42 of edible composition 44 may comprise approximately 440 grams of confectioners' sugar, 30 grams of meringue powder, ½ teaspoon (2.2 grams) extract (vanilla, lemon, almond), 150 milliliters (149 grams) of water.

In order to prepare the edible composition 44, the confectioners' sugar and meringue powder may be first mixed until thoroughly combined. The water and extract may then be added to the dry mixture and again mixed thoroughly until combined. The consistency of the foregoing edible composition 44 may be adjusted by raising or lowering the water content as necessary. After mixing, the edible composition 44 may be transferred to flexible container 46 before it begins to dry and harden.

With the foregoing sugar based composition 44, edible composition 44 may be understood to dry rather quickly upon being dispensed from flexible container 46 due to evaporation of the water therein. As such, upon encapsulating medicament 40 with the composition 44, the outer surface of the pet chew 60 will begin to harden and form a crust. The residence time, or the time between introduction of the edible composition 44 into the receptacle 14 and ejection of pet chew 60 from receptacle 14 will depend on factors such as the thickness of the edible composition 44. However, the pet chew 60 may generally be ejected once the pet chew 60 has sufficient integrity to be ejected from receptacle 14 without breakage. Moreover, given that the outer surface 90 of the pet chew 60 dries and hardens first, pet chew 60 may be quickly handled by hand without edible composition 44 being sticky or leaving a residue. Furthermore, no chemical reaction, or heating or cooling of the edible composition 44 may be required, or heating or cooling of the resultant pet chew 60, to obtain adequate solidification of the pet chew 60.

In other embodiments, edible composition 44 may also include edible resins, which may include biocompatible resins, including edible natural or naturally derived resin. Biocompatible resins may include resins that do not exhibit toxic and/or injurious effects on biological systems, such as the digestive track of a pet. Such biocompatible resins may be edible but may or may not be digestible. A non-limiting example of edible natural or naturally derived resins may include starch or starch based resins.

In one embodiment of processing starch for the edible composition 44, the process may begin with adjusting the water content of the starch by adding water to the starch, which may be present in the range of 20% to 40% by weight with respect to that of the starch, including all values and ranges therein, and mixing of the water with the starch. The mixing of the starch and water may be performed in a preconditioner during a preconditioning step.

This may then be followed by a reduction of the water content of the starch based composition. This reduction may be facilitated by placement of the composition into a plasticating device, such as a single or twin screw extruder. Plastication may be understood as the input of heat, mechanical action or both, into a material, which may result in a change in the material's viscosity. In the context of the present disclosure, where the water level charged in the extruder is preferably lowered during the course of extrusion, an extruder that is configured for venting may be employed, wherein such venting lowers the water level to a desired level. To facilitate such water level change, it may be particularly useful to apply a light vacuum to the extruder barrel at the vent port, to thereby provide a more efficient removal of water from the starch based extrudate.

The resulting starch based extrudate may be formed into the shape of beads/pellets, the size of which can be made to vary in accordance with standard pelletizing equipment, which may then be ground into a powder. The starch based powder may then be used to replace a certain amount of the confectioners' sugar in the edible composition 44.

Once the starch based extrudate is produced, the water level of the extrudate exiting the extruder is less than the water level of the starch based composition entering the extruder. Preferably, the water level of the starch/water extrudate may be lowered within the range of about 15% to 20% by weight of the weight of the product.

The aforementioned starch based composition may include any carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassava, konjac, kudzu, oca, sago, sorghum, sweet potato, taro, yams, fava beans, lentils and peas. The starch may be present in the starch based extrudate between about 30-99% including all increments and values therebetween such as levels above about 50%, 85%, etc.

The starch employed in the starch based composition may be raw starch, which may be understood as starch that has not seen a prior thermal molding history, such as extrusion or other type of melt processing step. The raw starch itself may also be native, which may be understood as unmodified starch recovered in the original form by extraction and not physically or chemically modified. The raw starch may also be in powder form of varying particle size, which may be understood as milled and/or pre-sifted. It should be understood that the raw starch may also have varying degrees moisture present.

The edible composition 44 may also include one or more additives that may include abrasive additives, breath sweeteners or compounds that may be ingested for improving oral health. Abrasive additives may include calcium carbonate, talc, sodium bicarbonate, etc. The abrasive additive may exhibit a Mohs hardness of 4 or less, including all values and ranges therein such as 0.5 to 4. In addition, the abrasive additive may be present between about 5-10% by weight of the edible composition 44.

Breath sweetening agents may also be incorporated into the edible composition 44 herein. Such agents may include mint, spearmint, peppermint or wintergreen and may also include parsley, chlorophyll, etc. Other ingestible compounds for improving oral health may include, but are not limited to, alma, bilberry fruit, hawthorn berry, Echinacea, goldenseal, folic acid, olive leaf extract, aloe vera, cranberry, licorice root, spirulina, horsetail, coenzyme Q10, yellow dock root, alfalfa leaf, cinnamon bark and tumeric root.

The edible composition 44 may also include Vitamin C alone or in combination with sodium hexametaphosphate. Breath sweetening and ingestible compounds may individually be present in the range of 0.01 to 5.0% by weight of the edible composition 44, including all values and ranges therein at 0.01% increments. In addition, the total amount of breath sweetening or ingestible compounds may be present in the range of 0.01 to 25.0% by weight of the edible composition 44.

Various additional additives may be added to the edible composition 44 herein. Such additives may include fiber, plasticizers, colorants, flavorants, and other olfactory stimulants. In addition, nutrient sources, such as sources of micronutrients, macronutrients and other dietary supplements may be incorporated. For example, with regard to starch based pet chew products, various additional additives may include those discussed further herein.

In some embodiments, the edible composition 44 may include cellulose. The cellulose may be, for example, a long-chain polymer of polysaccharide carbohydrate. The cellulose may also be derived or extracted from plants. The cellulose may be incorporated into the edible composition 44 between about 1-15% by weight of the starch based composition and any increment or value therebetween including 4%, 10%, 11%, etc.

Emulsifiers or surfactants may also be incorporated into the edible composition 44. The emulsifier may be present between about 1-10% by weight of the starch based composition and all increments or values therebetween including 3%, 4%, etc. The emulsifier may include, for example, lecithin, which may be extracted or derived from, for example, egg yolk or soy beans.

The edible composition 44 may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the edible composition 44. The humectant may include, for example, oat fiber. The humectant may be incorporated between about 0.1-5% by weight of the edible composition 44 including all intervals and values therebetween, including 1%, 25%, etc. A humectant may be understood to be any additive that may absorb water in the material.

The edible composition 44 may include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the base composition, including all increments and values therbetween, including 10%, 20%, etc.

The edible composition 44 may also include saccharomyces cerevisiae, commonly known as "bakers yeast" or "brewers yeast." Saccharomyces cerevisiae is more traditionally known to ferment sugars present in flour or dough, yielding carbon dioxide and alcohol. The saccharomyces cervisiae may be present in the base composition in the range of 0.1 to 5% by weight.

The edible composition 44 may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10 (discussed further herein), antioxidants, phytonetrients and cofactor mineral nutrients and other cell constituents. The enzymes and/or co-enzymes may be present between 0.1-10% by weight of the edible composition 44, including all increments and values therebetween such as 1%, 5%, etc.

Other additives may also be introduced into the edible composition 44 as well. These additives may include vegetable matter, fruit matter, rawhide, nuts, nut bits or nut flour such as peanut flour, and animal or fish products, by-products, meal or digests, etc. Glutens may also be incorporated into the starch based compositions. Gluten may be understood as water-insoluble protein complex extracted from cereal grains such as maize or corn and wheat. These additives may be present individually or cumulatively between about 0.1-50% by weight of the starch based composition and all increments and values therebetween including 0.1-5.0%, 15%, 25%, etc.

Additionally, as alluded to above, herbs, herbal extracts, vitamins, minerals, and attractants, may be incorporated into the edible composition 44. For example, in the case of dogs, preferred minerals may include calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium may be required in gram amounts/day, whereas iron, zinc, copper, iodine, and selenium are only required in mg or µg/day. The chew herein can therefore be modified to reflect a higher or lower concentration of a given mineral, according to nutritional requirements.

Turning next to the herbal component, the herbs may be selected from the group consisting of St. Johns Wort, Kava Kava, Ginkgo Biloba, Ginseng (Asian or Siberian varieties), and mixtures thereof. Other herbs include Catsclaw, Camomile, Saw Palmetto, Valerina, V. Agnus-Castus, Black Cohosh, and Milk Thistle. Herbs may also include aloe, astragalus, burdock, chestnut, coriolus, versicolor, couchgrass, crampbark, dandelion root, dong quai, elecampane, evening primrose, eyebright, false unicorn root, feverfew, garlic ginger, gota kola, grape seed extract, green tea, gugulipid, hops, ivy, milk thistle, mistletoe (American Asian and European varieties), motherwort, oats, osha, passion flower, pumpkin pygeum, red clover, rosemary, sarsaparilla, skullcap, saw palmetto, stinging nettle, wild indigo, wild yam and yerba mansa. In addition, glucosamines and/or chondroitin can be added to any of the embodiments described herein.

Attractants may include compounds listed herein in addition to animal or fish digests, or other compounds that may increase an animal's interest in the edible composition 44.

The above additives (minerals, herbs and attractants) may be present individually or cumulatively between about 0.01-25% by weight of the edible composition 44 and any increment or value therebetween including 0.01-0.5%, 10%, 20%, etc.

Any additional additives may be added during the preconditioning process or the extrusion process of the starch. In some embodiments, depending on the sensitivity or mixability of the additives, different additives may be added at different steps during the process or may be added multiple times during a process.

In may now be appreciated that the present disclosure relates to pet chew products, methods of forming pet chew products, apparatus to form pet chew products and methods of entertaining pets with pet chew products.

While particular embodiments of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. A pet chew forming apparatus for dispensing a medicament comprising:
   a housing comprising a piston cylinder; and
   a plunger having an elongated piston operable with the piston cylinder; wherein:
   the piston is extendable from and retractable into the piston cylinder by sliding movement;
   the piston includes a receptacle defined by at least one piston sidewall, said receptacle comprising a bottom and at least one receptacle sidewall;
   said piston sidewall comprises at least one opening to provide access to said receptacle;
   the housing includes a connection port operable to connect with a container of edible composition;
   the plunger is positionable in a first loading position relative to the housing to expose the opening to the receptacle such that a medicament is insertable into the receptacle through the opening;
   the plunger is further positionable in a second loading position relative to the housing to expose the opening to the receptacle such that an edible composition is insertable into the receptacle through the opening;
   the plunger is further positionable in an ejection position relative to the housing to eject a pet chew comprising the edible composition and the medicament from the receptacle: and
   at least a portion of the bottom of said receptacle comprises a hinged door configured to facilitate removal of said pet chew from said receptacle.

2. The apparatus of claim 1 wherein:
   the receptacle includes a plurality of raised elements on at least one of a side wall and a bottom side wall thereof which support the medicament away from a side or bottom of the receptacle.

3. The apparatus of claim 1 wherein:
   the connection port is to mechanically connect the housing and the container of edible composition.

4. The apparatus of claim 1 wherein:
   the connection port comprises a threaded connector.

5. The apparatus of claim 4 wherein:
   the threaded connector includes internal threads to connect with external threads located on the container of the edible composition.

6. The apparatus of claim 1 wherein:
   the connection port provides a male or female connector to connect with a female or male connector, respectively, of the container of edible composition.

7. The apparatus of claim 1 wherein:
   the hinged door is configured to facilitate removal of the pet chew through said opening.

8. The apparatus of claim 1 wherein:
   the receptacle includes a window which aligns with a window in the housing when the plunger is positioned in the second loading position such that when edible composition is inserted into the receptacle the edible composition is visible through the aligned windows as the edible composition fills the receptacle.

9. The apparatus of claim 1 wherein:
   at least one of the plunger and the housing includes a scale to determine a fill level of the receptacle.

10. The apparatus of claim 1 wherein:
    the hinged door is to facilitate removal of the pet chew through the bottom of said receptacle.

11. The apparatus of claim 10 wherein: said hinged door comprises all of the bottom of said receptacle.

12. The apparatus of claim 1 wherein:
    the piston is keyed to the piston cylinder such that the piston may only be inserted into the piston cylinder in one orientation to inhibit improper installation.

13. The apparatus of claim 1 wherein:
    the plunger and housing are connectable and disconnectable from each other by a mechanical connection means.

14. The apparatus of claim 1 wherein:
    the housing includes a medicament loading port.

15. The apparatus of claim 1 further comprising:
a heater.

16. The apparatus of claim 1 further comprising:
a cooler.

17. The apparatus of claim 1 further comprising:
a fan.

18. A method of forming a pet chew for dispensing a medicament comprising:
 providing a pet chew forming apparatus, the apparatus comprising:
  a housing comprising a piston cylinder; and
  a plunger having an elongated piston operable with the piston cylinder; wherein:
   the piston is extendable from and retractable into the piston cylinder by sliding movement;
   the piston includes a receptacle defined by at least one piston sidewall, said receptacle comprising a bottom and at least one receptacle sidewall;
   said piston sidewall comprises at least one opening to provide access to said receptacle;
   the housing includes a connection port operable to connect with a container of edible composition;
   the plunger is positionable in a first loading position relative to the housing to expose the opening to the receptacle such that a medicament is insertable into the receptacle through the opening;
   the plunger is further positionable in a second loading position relative to the housing to expose the opening to the receptacle such that an edible composition is insertable into the receptacle through the opening;
   the plunger is further positionable in an ejection position relative to the housing to eject a pet chew comprising the edible composition and the medicament from the receptacle; and
   at least a portion of the bottom of said receptacle comprises a hinged door configured to facilitate removal of said pet chew from said receptacle;
 positioning the plunger in the first loading position and inserting the medicament into the receptacle;
 positioning the plunger in the second loading position and inserting the edible composition into the receptacle such that the edible composition at least partially encapsulates the medicament;
 positioning the plunger in the ejection position; and
 ejecting the pet chew from the receptacle at least in part using the hinged door, the pet chew comprising the edible composition and the medicament.

* * * * *